(12) United States Patent
Wu et al.

(10) Patent No.: US 10,011,699 B2
(45) Date of Patent: Jul. 3, 2018

(54) INDUCTIVELY CURABLE COMPOSITION

(71) Applicant: 3M INNOVATIVE PROPERTIES COMPANY, St. Paul, MN (US)

(72) Inventors: Jung-Sheng Wu, Woodbury, MN (US); Lijun Zu, Woodbury, MN (US); Zeba Parkar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/324,738

(22) PCT Filed: Aug. 18, 2015

(86) PCT No.: PCT/US2015/045606
§ 371 (c)(1),
(2) Date: Jan. 9, 2017

(87) PCT Pub. No.: WO2016/032795
PCT Pub. Date: Mar. 3, 2016

(65) Prior Publication Data
US 2017/0198116 A1    Jul. 13, 2017

Related U.S. Application Data

(60) Provisional application No. 62/043,460, filed on Aug. 29, 2014.

(51) Int. Cl.
| | |
|---|---|
| *C08K 9/00* | (2006.01) |
| *C08K 3/22* | (2006.01) |
| *C08K 9/02* | (2006.01) |
| *C08J 3/24* | (2006.01) |
| *C08K 3/26* | (2006.01) |
| *C08K 3/36* | (2006.01) |
| *C08K 7/02* | (2006.01) |

(52) U.S. Cl.
CPC ............ *C08K 3/22* (2013.01); *C08J 3/247* (2013.01); *C08K 3/26* (2013.01); *C08K 3/36* (2013.01); *C08K 7/02* (2013.01); *C08K 9/02* (2013.01); *C08J 2363/02* (2013.01); *C08K 2003/2244* (2013.01); *C08K 2003/2275* (2013.01); *C08K 2003/265* (2013.01); *C08K 2201/003* (2013.01); *C08K 2201/01* (2013.01); *C08K 2201/011* (2013.01)

(58) Field of Classification Search
CPC ..... C08K 3/22; C08K 3/26; C08K 3/36; C08J 3/247
See application file for complete search history.

(56) References Cited

U.S. PATENT DOCUMENTS

| | | |
|---|---|---|
| 3,018,262 A | 1/1962 | Schroeder |
| 3,298,998 A | 1/1967 | McConnell |
| 3,562,223 A | 2/1971 | Bargain |
| 3,627,780 A | 12/1971 | Bonnard |
| 3,839,358 A | 10/1974 | Bargain |
| 4,100,140 A | 7/1978 | Zahir |
| 4,157,360 A | 6/1979 | Prevorsek |
| 4,455,205 A | 6/1984 | Olsen |
| 4,468,497 A | 8/1984 | Street |
| 4,478,876 A | 10/1984 | Chung |
| 4,486,504 A | 12/1984 | Chung |
| 4,491,508 A | 1/1985 | Olson |
| 4,522,958 A | 6/1985 | Das |
| 4,597,801 A * | 7/1986 | Stratta ............... B01F 17/0085 |
| | | 106/403 |
| 4,938,886 A | 7/1990 | Lindsten |
| 4,969,968 A | 11/1990 | Leatherman |
| 5,093,545 A | 3/1992 | McGaffigan |
| 5,258,225 A | 11/1993 | Katsamberis |
| 5,338,497 A | 8/1994 | Murray |
| 5,340,428 A | 8/1994 | Kodokian |
| 5,529,708 A | 6/1996 | Palmgren |
| 5,648,407 A | 7/1997 | Goetz |
| 5,677,050 A | 10/1997 | Bilkadi |
| 5,833,795 A | 11/1998 | Smith |
| 5,837,088 A | 11/1998 | Palmgren |
| 6,045,648 A | 4/2000 | Palmgren |
| 6,056,844 A | 5/2000 | Guiles |
| 6,299,799 B1 | 10/2001 | Craig |
| 6,376,590 B2 | 4/2002 | Kolb |
| 7,241,437 B2 | 7/2007 | Davidson |
| 7,348,374 B2 | 3/2008 | Martinazzo |
| 7,984,738 B2 | 7/2011 | Lamarca |
| 8,448,885 B2 * | 5/2013 | Nelson ............... B82Y 30/00 |
| | | 241/21 |
| 8,487,019 B2 | 7/2013 | Nelson |
| 2002/0113066 A1 | 8/2002 | Stark |
| 2004/0129924 A1 | 7/2004 | Stark |
| 2011/0017963 A1 | 1/2011 | Wu |
| 2011/0245376 A1 | 10/2011 | Schultz |

(Continued)

FOREIGN PATENT DOCUMENTS

| | | | |
|---|---|---|---|
| WO | WO 2011/023430 | * | 3/2011 |
| WO | WO 2014-151363 | | 9/2014 |

OTHER PUBLICATIONS

Goodman, Handbook of Thermoset Plastics, 1998, 122-129.
Krevelen, Properties of Polymers; Their Correlation With Chemical Structure; Their Numerical Estimation and Prediction From Additive Group Contributions, 1990, 189-225.
Miller, "Induction heating of FeCo nanoparticles for rapid rf curing of epoxy composites", Journal of Applied Physics, 2009, vol. 105, pp. 07E714-1-07E714-3.
Park, "Processing of Iron Oxide-epoxy Vinyl Ester Nanocomposites", Journal of Composite Materials, 2003, vol. 37, No. 5, pp. 465-476.

(Continued)

*Primary Examiner* — Hannah J Pak
(74) *Attorney, Agent, or Firm* — Kent S. Kokko

(57) ABSTRACT

An inductively curable thermoset compositions comprising a thermoset resin and, dispersed therein, susceptor particles and surface modified silica particles is described.

13 Claims, 1 Drawing Sheet

(56) References Cited

U.S. PATENT DOCUMENTS

2012/0022184 A1    1/2012  Beisele
2012/0214948 A1    8/2012  Condo
2014/0004348 A1*   1/2014  Vucak .................... B01J 2/006
                                                     428/403

OTHER PUBLICATIONS

Ye, "Induction Curing of Thiol—Acrylate and Thiol—Ene Composite Systems", Macromolecules, 2011, vol. 44, pp. 4988-4996.
International Search Report for PCT International Application No. PCT/US2015/045606, dated Oct. 20, 2015, 3pgs.

* cited by examiner

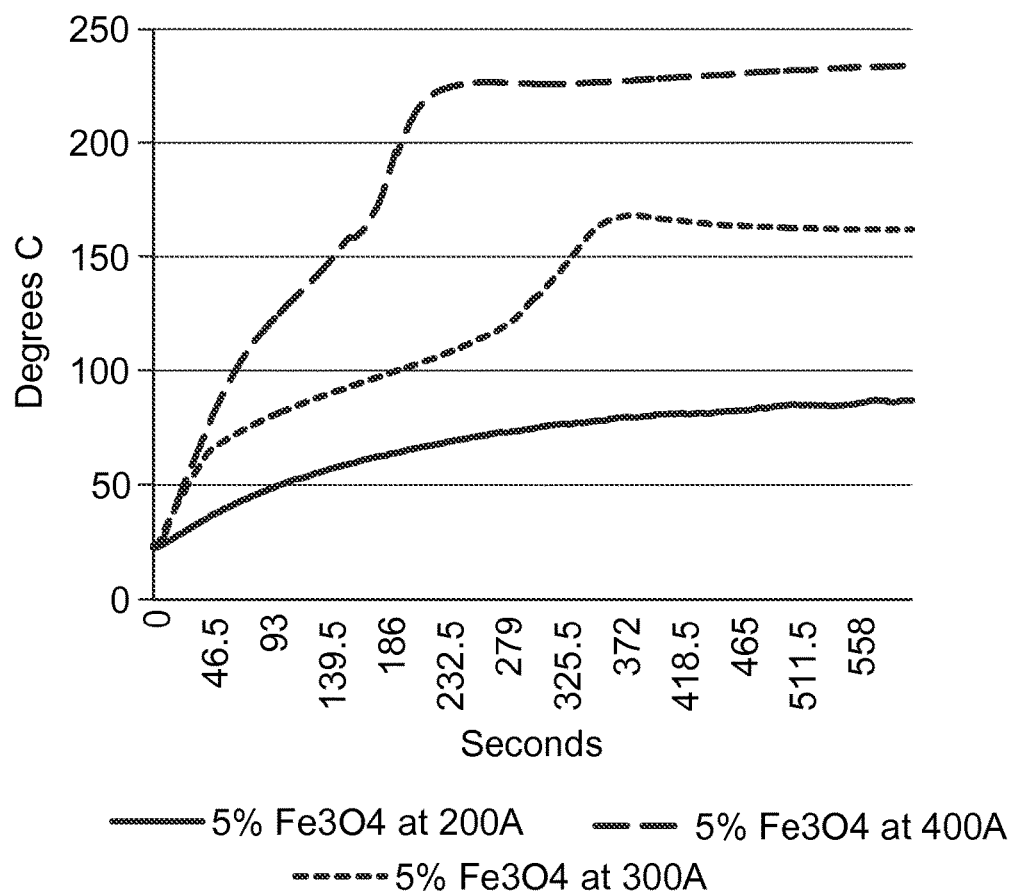

INDUCTIVELY CURABLE COMPOSITION

CROSS REFERENCE TO RELATED APPLICATIONS

This application is a national stage filing under 35 U.S.C. 371 of PCT/US2015/045606, filed Aug. 18, 2015, which claims the benefit of U.S. Application No. 62/043,460, filed Aug. 29, 2014, the disclosure of which is incorporated by reference in its/their entirety herein.

FIELD OF THE INVENTION

The present disclosure provides inductively curable thermoset compositions comprising a thermoset resin and, dispersed therein, susceptor particles and surface modified nanoparticles.

BACKGROUND

Currently available technologies for curing or molding polymers typically use a heated mold that supplies heat to polymeric bulk by conduction. This is inefficient, non-uniform, difficult to control precisely and leads to defective and unsatisfactory parts. For instance, when curing a polymer or composite part in a mold, the heat is conducted from the external surfaces, leading to long process times and unacceptable residual stresses within the final product.

Ferromagnetic particles (susceptors) are known to rapidly convert incident energy into heat at well dispersed sites at polymeric interfaces. Magnetic susceptors are used to convert energy derived from radio frequency induction heaters to heat energy at a point of application. For example, U.S. Pat. No. 5,529,708 (Palmgren et al.) discloses a method for preparing a hot melt adhesive by incorporating magnetic susceptor particles in a hot melt adhesive matrix and subjecting the susceptor particles to a magnetic induction field thereby melting the adhesive matrix.

Conventional induction heating uses micron-sized particles, typically from 1-50 microns. Known particles may contain iron(II,III) oxide, zinc doped iron oxide, nickel, and cobalt. The heating capability of these particles is conventionally expected to reduce significantly as the particle size decreases.

Current research on induction susceptor particles focuses on tailoring particles so that their Curie temperatures approach the target curing temperature of the samples. Curie temperature is the temperature where a material's permanent magnetism changes to induced magnetism—above this temperature these susceptor particles would lose their heating capability. Modifying the Curie temperature is tricky, unpredictable and involves complicated chemistry.

SUMMARY

The present disclosure provides inductively curable thermoset compositions comprising a thermoset resin and, dispersed therein, susceptor particles and surface modified nanoparticles. The present curable composition enables rapid, controlled and uniform curing of samples and overcomes problems inherent in oven-cured samples, including non-uniformity, bubbles, voids, and non-uniform physical properties.

The present disclosure describes ferromagnetic particles as susceptors for induction heating to rapidly cure resins. For example, iron(II,III) oxide/magnetite nanoparticles (5-100 nm) rapidly generate uniformly dispersed heat within the bulk of an uncured resin, resulting in even and uniform curing. The properties of the cured products are comparable to or exceed the properties of conventionally oven-cured products. In addition to curing, the present technology can also be used for applications such as controlled softening, welding and melting. The present disclosure enables rapid curing of thermosetting resins in composite matrices.

It has been discovered that curing can be controlled by optimizing the particle size, induction frequency and induction power/amplitude, rather than optimizing the Curie temperature. This also allows one to deploy induction susceptors at temperatures well below their Curie temperatures. For instance, though the Curie temperature of Iron oxide(II, III) is around 550° C., one may optimize induction parameters to deploy iron (II,III) oxide susceptors for curing epoxies at 150° C., without attempting to engineer the Curie temperatures of those particles.

It has further been found that addition of thermally conducting fillers, in particular surface modified inorganic nanoparticles increase the $T_g$ of the induction cured comparable to an oven cured sample.

In some embodiments the present disclosure uses a combination of step curing and a thermally conducting filler to remove voids and to distribute the rapid heat generated through the resin to get uniform heating. The composition may be partially cured at a first frequency, power and/or magnetic field strength, then fully cured at a second frequency, power and/or magnetic field strength. One may partially cure, coat, then fully cure, or one may partially cure, add reinforcing fibers, then fully cure. In some embodiments the inductively curable composition further comprises reinforcing fibers, which may be cured to produce prepregs and other structural articles.

The instant disclosure further provides a method of molding which comprises adding the inductively curably composition to a mold, then inductively curing.

The instant disclosure further provides a method of bonding which comprises coating the inductively curably composition on a first substrate, adding a second substrate, then inductively curing.

In another aspect, this invention provides inductively curable compositions comprising susceptor particles, inorganic nanoparticles (e.g., surface-modified silica) in curable resin (e.g., epoxy resin); and (b) reinforcing fibers (e.g., carbon fibers). Preferably, the compositions are essentially volatile-free, i.e., essentially free of volatile materials released or formed during the cure of the compositions. The term "curable," as used herein, means chemically or physically crosslinkable to form a glassy, insoluble, non-flowable network which is maintained under normal use conditions.

The compositions of the invention can be cured to provide fiber-reinforced composites which exhibit improved resin-dominated mechanical properties, e.g., impact resistance, shear modulus, and compression strength (relative to the corresponding conventionally cured compositions without nanoparticles). Toughness is often improved, so that the cured compositions exhibit improved impact resistance as well as improved shear modulus and/or compression strength.

Furthermore, the compositions of the invention are low in viscosity and are therefore readily processable, e.g., by hot-melt techniques. The compositions retain the typical cure profile of conventional curable resins, and the resulting cured materials exhibit minimal change in glass transition temperature and minimal deterioration in thermal stability, environmental resistance, or moisture absorption (relative to the corresponding cured compositions without particles).

The compositions thus satisfy the need in the art for easily processable compositions which upon curing exhibit improved compression strength and/or shear modulus with comparable or even improved toughness.

In other aspects, this invention provides composites comprising the cured compositions of the invention, articles comprising the composites, prepregs comprising the compositions of the invention, a process for preparing composites having improved toughness and improved shear modulus (and composites and articles prepared thereby), and various novel curable resin sols.

BRIEF DESCRIPTION OF THE FIGURES

FIG. 1 is a plot of the temperature profile vs. current for the examples.

DETAILED DISCLOSURE

Curable resins suitable for use in the compositions of the invention are those resins, e.g., thermosetting resins, which are capable of being cured to form a glassy network polymer. Suitable resins include, e.g., epoxy resins, curable imide resins and polyimides including those having a terminal reactive group such as acetylene, diacetylene, phenylethynyl, norbornene, nadimide, or benzocyclobutane), epoxies, and amines), bisbenzocyclobutane resins, polycyanate ester resins, and mixtures thereof. The resins can be utilized in the form of either monomers or prepolymers. Preferred curable resins include epoxy resins, maleimide resins, polycyanate ester resins, and mixtures thereof. Epoxy resins are especially preferred due to their processing characteristics, high temperature properties, and environmental resistance.

Epoxy resins are well-known in the art and comprise compounds or mixtures of compounds which contain one or more epoxy groups. The compounds can be saturated or unsaturated, aliphatic, alicyclic, aromatic, or heterocyclic, or can comprise combinations thereof. Compounds which contain more than one epoxy group (i.e., polyepoxides) are preferred.

Polyepoxides which can be utilized in the compositions of the invention include, e.g., both aliphatic and aromatic polyepoxides, but aromatic polyepoxides are preferred for high temperature applications. The aromatic polyepoxides are compounds containing at least one aromatic ring structure, e.g. a benzene ring, and more than one epoxy group. Preferred aromatic polyepoxides include the polyglycidyl ethers of polyhydric phenols (e.g., bisphenol A derivative resins, epoxy cresol-novolac resins, bisphenol F derivative resins, epoxy phenol-novolac resins), glycidyl esters of aromatic carboxylic acids, and glycidyl amines of aromatic amines. The most preferred aromatic polyepoxides are the polyglycidyl ethers of polyhydric phenols.

Representative examples of aliphatic polyepoxides which can be utilized in the compositions of the invention include 3',4'-epoxycyclohexylmethyl-3,4-epoxycyclohexanecarboxylate, 3,4-epoxycyclohexyloxirane, 2-(3',4'-epoxycyclohexyl)-5,1"-spiro-3",4"-epoxycyclohexane-1,3-dioxane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyldimethylmethane, and mixtures thereof.

Representative examples of aromatic polyepoxides which can be utilized in the compositions of the invention include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-[4-(2,3-epoxypropoxy)phenyl]propane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. No. 3,018,262 (Schoeder) and U.S. Pat. No. 3,298,998 (Coover et al.), the descriptions of which are incorporated herein by reference, as well as the derivatives described in the Handbook of Epoxy Resins by Lee and Neville, McGraw-Hill Book Co., New York (1967) and in Epoxy Resins, Chemistry and Technology, Second Edition, edited by C. May, Marcel Dekker, Inc., New York (1988), and mixtures thereof. A preferred class of polyglycidyl ethers of polyhydric phenols for use in the compositions of the invention are the diglycidyl ethers of bisphenol that have pendant carbocyclic groups, e.g., those described in U.S. Pat. No. 3,298,998 (Coover et al.), the description of which is incorporated herein by reference.

Examples of such compounds include 2,2-bis[4-(2,3-epoxypropoxy)phenyl]norcamphane and 2,2-bis[4-(2,3-epoxypropoxy)phenyl]decahydro-1,4,5,8-dimethanonaphthalene. A preferred compound is 9,9-bis[4-(2,3-epoxypropoxy)phenyl]fluorene.

Suitable epoxy resins can be prepared by, e.g., the reaction of epichlorohydrin with a polyol, as described, e.g., in U.S. Pat. No. 4,522,958 (Das et al.), the description of which is incorporated herein by reference, as well as by other methods described by Lee and Neville and by May, supra. Many epoxy resins are also commercially available.

Maleimide resins suitable for use in the compositions of the invention include bismaleimides, polymaleimides, and polyaminobismaleimides. Such maleimides can be conveniently synthesized by combining maleic anhydride or substituted maleic anhydrides with di- or polyamine(s). Preferred are N,N'-bismaleimides, which can be prepared, e.g., by the methods described in U.S. Pat. No. 3,562,223 (Bargain et al.), U.S. Pat. No. 3,627,780 (Bonnard et al.), U.S. Pat. No. 3,839,358 (Bargain), and U.S. Pat. No. 4,468,497 (Beckley et al.) (the descriptions of which are incorporated herein by reference) and many of which are commercially available.

Representative examples of suitable N,N'-bismaleimides include the N,N'-bismaleimides of 1,2-ethanediamine, 1,6-hexanediamine, trimethyl-1,6-hexanediamine, 1,4-benzenediamine, 4,4'-methylenebisbenzenamine, 2-methyl-1,4-benzenediamine, 3,3'-methylenebisbenzenamine, 3,3'-sulfonylbisbenzenamine, 4,4'-sulfonylbisbenzenamine, 3,3'-oxybisbenzenamine, 4,4'-oxybisbenzenamine, 4,4'-methylenebiscyclohexanamine, 1,3-benzenedimethanamine, 1,4-benzenedimethanamine, 4,4'-cyclohexanebisbenzenamine, and mixtures thereof.

Co-reactants for use with the bismaleimides can include any of a wide variety of unsaturated organic compounds, particularly those having multiple unsaturation, either ethylenic, acetylenic, or both. Examples include acrylic acids and amides and the ester derivatives thereof, e.g., acrylic acid, methacrylic acid, acrylamide, methacrylamide, and methylmethacrylate; dicyanoethylene; tetracyanoethylene; allyl alcohol; 2,2'-diallylbisphenol A; 2,2'-dipropenylbisphenol A; diallylphthalate; triallylisocyanurate; triallylcyanurate; N-vinyl-2-pyrrolidinone; N-vinyl caprolactam; ethylene glycol dimethacrylate; diethylene glycol dimethacrylate; trimethylolpropane triacrylate; trimethylolpropane trimethacrylate; pentaerythritol tetramethacrylate; 4-allyl-2-methoxyphenol; triallyl trimellitate; divinyl benzene; dicyclopentadienyl acrylate; dicyclopentadienyloxyethyl acrylate; 1,4-butanediol divinyl ether; 1,4-dihydroxy-2-butene; styrene; .alpha.-methyl styrene; chlorostyrene; p-phenylstyrene; p-methylstyrene; t-butylstyrene; and phenyl vinyl ether. Of particular interest are resin systems employing a bismaleimide in combination with a bis(alkenylphenol). Descriptions of a typical resin system of this type are found in U.S. Pat. No. 4,100,140 (Zahir et al.), the descriptions of which are incorporated herein by reference. Particularly preferred components are 4,4'-bismaleimidodiphenylmethane and o,o'-diallyl bisphenol A.

Polycyanate ester resins suitable for use in the compositions of the invention can be prepared by combining cyanogen chloride or bromide with an alcohol or phenol. The preparation of such resins and their use in polycyclotrimerization to produce polycyanurates are described in U.S. Pat. No. 4,157,360 (Chung et al.), the descriptions of which are incorporated herein by reference. Representative examples of suitable polycyanate ester resins include 1,2-dicyanatobenzene, 1,3-dicyanatobenzene, 1,4-dicyanatobenzene, 2,2'-dicyanatodiphenylmethane, 3,3'-dicyanatodiphenylmethane, 4,4'-dicyanatodiphenylmethane, and the dicyanates prepared from biphenol A, bisphenol F, and bisphenol S. Tri- and higher functionality cyanate resins are also suitable.

In some embodiments the thermoset resin system comprises a curable (i.e., crosslinkable) resin and a reactive diluent. For example, in some embodiments, an unsaturated polyester resin may be used. In some embodiments, the unsaturated polyester resin is the condensation product of one or more carboxylic acids or derivatives thereof (e.g., anhydrides and esters) with one or more alcohols (e.g., polyhydric alcohols).

In other embodiments, vinyl ester resins may be used. As used herein, the term "vinyl ester" refers to the reaction product of epoxy resins with ethylenically-unsaturated monocarboxylic acids. Exemplary epoxy resins include bisphenol A digycidal ether (e.g., EPON 828, available from Hexion Specialty Chemicals, Columbus, Ohio). Exemplary monocarboxylic acids include acrylic acid and methacrylic acid. Although such reaction products are acrylic or methacrylic esters, the term "vinyl ester" is used consistently in the gel coat industry. (See, e.g., Handbook of Thermoset Plastics (Second Edition), William Andrew Publishing, page 122 (1998).)

In still other embodiments, (meth)acrylate resins, including, e.g., urethane (meth)acrylates, polyethyleneglycol (multi)(meth)acrylates, and epoxy (multi)(meth)acrylates may be used. In other embodiments, direct milling into epoxy resins may be achieved.

In such embodiments the curable resin is both soluble in, and reacts with the reactive diluent to form a copolymerized network. Depending on the curable resin, exemplary reactive diluents include styrene, a-methylstyrene, vinyl toluene, divinylbenzene, triallyl cyanurate, methyl methacrylate, diallyl phthalate, ethylene glycol dimethacrylate, hydroxyethyl methacrylate, hydroxyethyl acrylate, and other mono- and multi-functional (meth)acrylates. Reactive diluents used with epoxy resins also include mono- and multi-functional glycidyl ethers such as polypropylene glycol diclycidyl ether, 2-ethylhexyl glycidyl ether, allyl glycidyl ether, n-butyl glycidyl ether, 1,4-butanediol diglycidyl ether, 1,4-cyclohexanediol diglycidyl ether, hexanedioldiglycidyl ether, and 3,4-epoxycyclohexylmethyl 3,4-epoxycyclohexane carboxylate.

With each of the thermoset resins, a catalyst or initiator, such as are known in the art may be used.

The material for the susceptor must be magnetic in nature, and it is preferable that the material have a large magnetic hysteresis loop. Inorganic materials suitable for preparing the susceptor particles include metals, such as iron, cobalt, and nickel, alloys thereof, such as stainless steel, amorphous metal alloys, and oxides of metals, such as ferrites. The heating efficiency of the susceptor of this invention is dependent on the magnetic properties of the curable composition. As the temperature of the curable composition approaches its Curie temperature (Tc), its magnetic properties decrease so that the material is no longer magnetic. At the Curie temperature, the material can no longer efficiently absorb induction energy. When the material cools to a temperature below its Curie temperature, it becomes magnetic again and will absorb induction energy. Control of Curie temperature can be used to limit the maximum temperature of the material being heated. By appropriate choice of the susceptor material, a wide variety of limiting temperatures can be obtained. Examples of materials that can be used to provide an appropriate Curie temperature include magnetic metals, such as iron, cobalt, or nickel, in combination with selected amounts of metals or metalloids, such as silicon, phosphorous, or boron.

The compositions further comprise finely divided ferromagnetic, ferrimagnetic, paramagnetic, superparamagnetic or piezoelectric materials which may be heated by alternating electric, magnetic, or electromagnetic fields so that the polymer or resin in the powder coating is heated above its softening point or melting point, and, optionally, above its curing temperature.

Suitable magnetic materials include those that are commercially available in several size ranges (nano to micro). Examples of finely divided magnetic materials include ferromagnetic metals, e.g., Fe, Co and Ni, or ferromagnetic alloys (alloys of the above described metal), Ni—Fe alloy, steel-Fe—Ni alloy, steel; gamma-$Fe_2O_3$, $Fe_3O_4$; transparent polymer-Cobalt oxide nanocomposites; ferromagnetic compounds, such as, $Ni_{1-x}Zn_xFe_2O_4$, $MnO$—$F_2O_3$, $Ni$—$Zn$—$Fe_2O_3$ and other Ni—Zn alloys having a Tc of less than 250° C.; densified and heat treated ferromagnetic compounds, e.g. containing strontium, iron, oxygen, like $SrFe_{12}O_{19}$, or cobalt, barium, iron, oxygen, like $CO_2Ba_2Fe_{12}O_{22}$, and other vitrified compounds from ferromagnetic metals; multilayer particles, such as iron oxide Co-coated iron oxide powder; ferrimagnetic compounds, such as Jacobsite or ferrimagnetic $MnFe_2O_4$, feroxyhyte or ferrimagnetic delta-FeOOH, and $Cu_2MnIn$; soft ferrites such as Barium ferrite, Co, Ti, Nb-substituted Ba-ferrite; hexagonal ferrite particles comprising SrF, $M^{2+}2A$, $M^{2+}2D$ or $M^{2+}2Z$, where 2A is $BaO:2M^{2+}O:8Fe_2O_3$, 2D is $2(BaO:M^{2+}O:Fe_2O_3)$, 2Z is $3BaO:2M^{2+}O:12Fe_2O_3$, and $M^{2+}$ is divalent cation; magnetically soft ferrite particles having composition 1TO:$1Fe_2O_3$ and TO is transition metal oxide; hard ferrites, such as hematite powder, 8 to 400 nm ferrosoferric oxide $Fe_2O_3.FeO$ or magnetite; paramagnetic Ni-rich austenite; and piezoelectric compounds such as $BaTiO_3$—$SrTiO_3$ Ferroelectrics, $BaTiO_3$, tungsten bronze oxides, such as $(Sr_{0.3}Ba_{0.7})Nb_2O_6$, $Ba_5SmTiZr_2Nb_7O_{30}$, and bismuth layer-structured ferroelectrics (BLSF), such as $BaBi_2Ta_2O_9$, and $Bi_3TiTaO_9$.

Soft ferrites and piezoelectric compounds are soft magnets and may be used. Preferred particles include steel-Fe—Ni and Fe—Ni—B, transparent polymer-Cobalt oxide nanocomposites, soft ferrites, $Cu_2MnIn$, Jacobsite, ferrimagnetic $MnFe_2O_4$, feroxyhyte or ferrimagnetic delta-FeOOH, piezoelectric compounds and $Ni_{1-x}Zn_xFe_2O_4$ compounds. For example, the one or more than one finely divided magnetic material may be chosen from $Ni_{1-x}Zn_xFe_2O_4$ compounds, wherein $0.4<X<0.75$, ferrimagnetic delta-FeOOH, $Cu_2MnIn$, piezoelectric compounds, soft ferrites, Fe—Ni—B, transparent polymer-Cobalt oxide nanocomposites, and mixture thereof.

The susceptor particles are desirably modified with a surface modifying agent that ionically bonds to the surface of the magnetic susceptor nanoparticle. Useful surface modifying agents generally have an acid functional groups to ionically bond to the susceptor, and a hydrophobic tail to render the susceptor compatible with the thermoset resin.

Particularly useful surface modify agents useful for the susceptor particles are A-Z-B dispersants wherein A is derived from a non-ionic surface active agent, B is an organic acid group which anchors the dispersing agent to the particles, and Z is a connecting group linking A to B wherein Z comprises at least one carbon atom. A may be referred to herein as the compatibilizing group, B as the anchor group, and Z as a connecting group between A and B. Use of A-Z-B surface modifying agents provides stable blends in thermoset resins.

The acid group B may be selected from carboxylic, phosphonic, photophoric or sulfonic acids. The compatibilizing group A is derived from a non-ionic surface active agent and is selected to be compatible with and dissolved by a specific resin. Non-ionic surface active agents from which A is derived include ethoxylated alcohols, ethoxylated alkyl phenols, ethoxylated fatty acids, ethoxylated amides, ethoxylated amines and ethylene oxide/propylene oxide block polymers.

The structure of the Z group which connects the compatibilizing group with the acid group may be selected for convenience in dispersant synthesis or to enhance physical or chemical characteristics of the dispersant. In general, for convenience in dispersant synthesis, the precursor of the connecting group is selected so that by chemical reaction of the A group precursor with the Z group precursor, the dispersant with the general structure A-Z-B is formed directly. Structures of Z which may be useful in the present invention are generally selected from alkylene, arylene and optionally include one or more ether, ester, amide, or urethane groups.

Examples of commercially available surface modifying agents include Solplus™ D570 (Lubrizol Corporation, Wickliffe, Ohio) or BYK-W 9010 dispersing additive (BYK USA, Wallingford Conn.).

Susceptor materials may range in average particle size from as small as 5 nanometers (nm) or more, or 15 nm or more, or 50 nm or more, or 100 nm. Magnetic materials may be of any shape, such as spherical, rod like, polygonal or amorphous. Coatings that contain homogeneously dispersed particles may heat more evenly and efficiently and smaller particles tend to disperse more evenly in coatings than larger particles. Smaller particle sizes increase the viscosity of the uncured composition, relative to an equal amount of larger susceptor particles. Accordingly, preferred particle sizes are 100 to 250 nm average particle diameter.

In many embodiments, the amount of susceptors material may be as low as 0.1 part by weight or more, or 0.5 part by weight or more, or 1.0 part by weight or more, and may range as high as 50 parts by weight or less, or 25 part by weight or less, or 10 parts by weight or less. Parts by weight is relative to 100 parts by weight of thermoset resin. Preferably the susceptor particles are used in amounts of 1 to 25 parts by weight, relative to 100 parts of thermoset resin. However, in some embodiments where very rapid heating is desired, amounts in excess of 50 parts by weight may be used. Generally, lower amounts of the larger size particles may be used, as the larger particles heat up more efficiently.

The inductively curable composition contains surface modified inorganic nanoparticles that serve as thermally conductive fillers in the inductive heating step and add mechanical strength and durability to the resultant cured thermoset polymer. Such thermally-conductive particles are not magnetically susceptible, are not readily water soluble and include inorganic oxides, carbonates, sulfates and sulfides. Particular preferred are surface modified silica and calcite nanoparticles.

The surface-modified nanoparticles are selected such that the composition formed therewith is free from a degree of particle agglomeration or aggregation that would interfere with the desired properties of the composition. The surface-modified nanoparticles are selected to be compatible with the thermoset resin. For resins that include a variety of components, the surface-modified nanoparticles may be selected to be compatible with at least one component of the resin.

The surface-modified nanoparticles have surface groups that modify the solubility characteristics of the nanoparticles. The surface groups are selected to render the particle compatible with the resin. In some embodiments the surface modified nanoparticles have a reactive functional group. For example, the surface groups can be selected to associate or react with at least one component of the resin to become part of the polymer network of the composition.

A variety of inorganic oxide particles can be used. The inorganic oxide particles can consist essentially of or consist of a single oxide such as silica, or can comprise a combination of oxides, such as silica and aluminum oxide, or a core of an oxide of one type (or a core of a material other than a metal oxide) on which is deposited an oxide of another type. Silica is a common inorganic particle.

The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid), e.g., as described in U.S. Pat. No. 5,648,407 (Goetz et al.); U.S. Pat. No. 5,677,050 (Bilkadi et al.) and U.S. Pat. No. 6,299,799 (Craig et al.). Aqueous sols (e.g. of amorphous silica) can be employed. Sols generally contain at least 2 wt. %, at least 10 wt. %, at least 15 wt. %, at least 25 wt. %, and often at least 35 wt. % colloidal inorganic oxide particles based on the total weight of the sol. The amount of colloidal inorganic oxide particle is typically no more than 50 wt. %. The surface of the inorganic particles can be "acrylate functionalized" as described in Bilkadi et al. The sols can also be matched to the pH of the binder, and can contain counter ions or water-soluble compounds (e.g., sodium aluminate), all as described in Kang et al. U.S. '798.

In some embodiments, the inorganic nanoparticles are calcite nanoparticles (calcium carbonate).

The inorganic nanoparticles are treated with a surface modifying agent. The surface-modifying agents can be represented by the formula X-Y, where the X group is capable of attaching to the surface of the particle (covalently, ionically or through strong physisorption), and the Y group renders the nanoparticle compatible with the thermoset resin.

For example X may be a trialkoxysilane groups that forms silanol links with silanol groups of a silica particle.) The Y group is a reactive or non-reactive functional group to render the surface modified nanoparticles compatible with the thermoset resin. A non-functional group does not react with other components in the system (e.g. the substrate). Non-reactive functional groups can be selected to render the particle relatively more polar, relatively less polar or relatively non-polar. In some embodiments the non-reactive functional group "Y" is a hydrophilic group such as a poly(oxyalkylene) group, or hydroxyl group. Y may also be selected from alkyl and aryl groups. Such surface modifying agents may be represented by the formula X-$Y^1$, where $Y^1$ is a non-reactive group, including alkyl and aryl groups and poly(oxyalkylene) groups.

In other embodiments, "Y" may include a reactive functional groups such as an ethylenically unsaturated polymerizable group, including epoxy that may be polymerized with the polymerizable resin or monomers. Such surface modifying agents may be represented by the formula X—$Y^2$, where $Y^2$ is a reactive group, that will copolymerize into the thermoset resin.

Surface-modifying the nanosized particles can provide a stable dispersion in the polymeric resin. Preferably, the surface-treatment stabilizes the nanoparticles so that the particles will be well dispersed in the polymerizable resin and results in a substantially homogeneous composition, i.e. the concentration of particles does not vary in the resin more than +/−10%. Furthermore, the nanoparticles can be modified over at least a portion of its surface with a surface treatment agent so that the stabilized particle can copolymerize or react with the polymerizable resin during curing. The incorporation of surface modified inorganic particles is amenable to covalent bonding of the particles to the free-radically polymerizable organic components, thereby providing a tougher and more homogeneous polymer/particle network.

Examples of surface treatment agents include alcohols, amines, carboxylic acids, sulfonic acids, phosphonic acids, silanes and titanates. The preferred type of treatment agent is determined, in part, by the chemical nature of the nanoparticle surface. Silanes are preferred for silica and other for siliceous fillers. Silanes and carboxylic acids are preferred for metal oxides such as zirconia. It is preferred in the case of silanes to react the silanes with the nanoparticle surface before incorporation into the resin.

The required amount of surface modifier is dependent upon several factors such as particle size, particle type, modifier molecular wt, and modifier type. In general, it is preferred that approximately a monolayer of modifier is attached to the surface of the particle. The surface-modifying agents may be used in amounts such that 0 to 100%, generally 1 to 90% of the surface functional groups (Si—OH groups) of the silica nanoparticles are functionalized. The number of functional groups is experimentally determined where quantities of nanoparticles are reacted with an excess of surface modifying agent so that all available reactive sites are functionalized with a surface modifying agent. Lower percentages of functionalization may then be calculated from the result. Generally, the amount of surface modifying agent is used in amount sufficient to provide up to twice the equal weight of surface modifying agent relative to the weight of inorganic nanoparticles. When used, the weight ratio of surface modifying agent to inorganic nanoparticles is preferably 2:1 to 1:10.

A combination of surface modifying agents can be useful, wherein at least one of the agents has a functional group co-polymerizable with a thermoset resin. Combinations of surface modifying agent can result in lower viscosity. For example, the polymerizing group may be a cyclic functional group subject to ring opening polymerization generally contains a heteroatom such as oxygen, sulfur or nitrogen, and preferably a 3-membered ring containing oxygen such as an epoxide.

Representative embodiments of surface treatment agents suitable for the silica nanoparticles and other inorganic oxides include compounds such as, for example, isooctyl trimethoxy-silane, N-(3-triethoxysilylpropyl)methoxyethoxyethoxyethyl carbamate, N-(3-triethoxysilylpropyl) methoxyethoxyethoxyethyl carbamate, 3-(methacryloyloxy) propyltrimethoxysilane, 3-acryloxypropyltrimethoxysilane, 3-(methacryloyloxy)propyltriethoxysilane, 3-(methacryloyloxy)propylmethyldimethoxysilane, 3-(acryloyloxypropyl) methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mere aptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof.

Useful organic acid surface-modifying agents include, e.g., oxyacids of carbon (e.g., carboxylic acid), sulfur and phosphorus, and combinations thereof.

Representative examples of polar surface-modifying agents having carboxylic acid functionality include $CH_3O(CH_2CH_2O)_2CH_2COOH$ and 2-(2-methoxyethoxy)acetic acid having the chemical structure $CH_3OCH_2CH_2OCH_2COOH$ and mono(polyethylene glycol) succinate.

Representative examples of non-polar surface-modifying agents having carboxylic acid functionality include octanoic acid, dodecanoic acid and oleic acid.

Examples of suitable phosphorus containing acids include phosphonic acids including, e.g., octylphosphonic acid, laurylphosphonic acid, decylphosphonic acid, dodecylphosphonic acid and octadecylphosphonic acid.

Useful organic base surface-modifying agents include, e.g., alkylamines including, e.g., octylamine, decylamine, dodecylamine and octadecylamine.

Examples of suitable surface-modifying alcohols include, e.g., aliphatic alcohols including, e.g., octadecyl, dodecyl, lauryl and furfuryl alcohol, alicyclic alcohols including, e.g., cyclohexanol, and aromatic alcohols including, e.g., phenol and benzyl alcohol, and combinations thereof. When the vehicle includes aromatic ring containing epoxy resins, useful surface-modifying groups can include an aromatic ring. Examples of surface-modifying groups particularly suitable for epoxy resin compositions are disclosed in U.S. Pat. No. 5,648,407 (Goetz et al.) and incorporated herein.

One method of assessing the compatibility of the surface-modified nanoparticles with the vehicle includes determining whether the resulting composition forms a stable dispersion when introduced into the composition. For transparent vehicles, one useful method of assessing the compatibility of the surface-modified nanoparticles with the transparent vehicle includes combining the surface-modified nanoparticles and the resin and observing whether the surface-modified nanoparticles appear to dissolve in the vehicle such that the resulting composition is transparent. The nature of the inorganic particle component of the surface-modified particle will prevent the surface-modified particle from actually dissolving in the vehicle, i.e., the surface-modified nanoparticles will be dispersed in the vehicle, however the compatibility of the surface groups with the vehicle will give the surface-modified nanoparticles the appearance of dissolving in the vehicle. As the size of the surface-modified nanoparticles increases, the haziness of the vehicle generally increases. Preferred surface-modified nanoparticles are selected such that they do not settle out of the resin.

In some embodiments, the compatibilizing segment may be selected to provide a positive enthalpy of mixing for the composition containing the surface-modified nanoparticles and the curable resin. If the enthalpy of mixing is positive, the dispersion of nanoparticles in the resin is typically stable. To ensure a positive enthalpy of mixing, the solubility parameter of the compatibilizing segment can be matched to the solubility parameter of the curable resin. In some embodiments, the materials can be selected such that the difference in these solubility parameters is no more than 4 $J^{1/2}$ $cm^{-3/2}$ and, in some embodiments, no more than 2 $J^{1/2}$ $cm^{-3/2}$ as determined according to Properties of Polymers; Their Correlation with Chemical Structure; Their Numerical Estimation and Prediction from Additive Group Contributions, third edition, edited by D. W. Van Krevelen, Elsevier Science Publishers B. V., Chapter 7, 189-225 (1990)), i.e., the "Solubility Parameter Procedure."

There are several methods known to determine the solubility parameter of a material such as a compatibilizing segment or a resin. For example, the solubility parameter of the material can be determined from measurements of the extent of equilibrium swelling of the material in a range of solvents of differing solubility parameters. The solubility parameters of the solvents themselves can be determined from their heats of evaporation. The solubility parameter delta ($\delta$) is related to the cohesive energy $E_{coh}$ and the specific volume V by the relationship $\delta=(E_{coh}/V)^{1/2}$. For solvents of low molecular weight, the cohesive energy is closely related to the molar heat of evaporation $\Delta H_{vap}$ according to $E_{coh}=\Delta H_{vap}-p\Delta V=\Delta H_{vap}-RT$. Thus, $E_{coh}$ and $\delta$ can be calculated from the heat of evaporation of the solvent or from the course of the vapor pressure as a function of temperature. To determine the solubility parameter of the material, a plot of equilibrium swelling of the material versus the solubility parameter of the solvents is generated. The solubility parameter of the material is defined as the point on this plot where maximum swelling is obtained. Swelling will be less for solvents having solubility parameters that are less than or greater than that of the material. Alternatively, there are several known methods for theoretically estimating the solubility parameter of a material based on the additive contributions of functional groups.

Suitable surface groups can also be selected based upon the solubility parameter of the surface group and the resin. Preferably the surface group, or the agent from which the surface group is derived, has a solubility parameter similar to the solubility parameter of the resin. When the resin is hydrophobic, for example, one skilled in the art can select from among various hydrophobic surface groups to achieve a surface-modified particle that is compatible with the hydrophobic resin. Similarly, when the resin is hydrophilic, one skilled in the art can select from hydrophilic surface groups. The particle can also include at least two different surface groups that combine to provide a particle having a solubility parameter that is similar to the solubility parameter of the vehicle.

In some preferred embodiments the surface modified, thermally-conductive nanoparticle is a surface modified calcite nanoparticle. The binding group "X" of the surface modifying agent X-Y bonds to the calcite, connecting the surface-modifying agent to the calcite core. Unlike many silica-based nanoparticle systems wherein the surface-modifying agents are covalently bonded to the silica, the surface-modifying agents for calcite are ionically bonded to (e.g., associated with) the calcite.

In order to retain the surface-modifying agents with the calcite cores during processing of the compositions, it may be desirable to select binding groups having high bond energies to calcite. Bond energies can be predicted using density functional theory calculations. In some embodiments, the calculated bond energies may be at least 0.6 electron volts. Generally, the greater the bond energy the greater the likelihood that the binding group will remain ionically associated with the particle surface. In some embodiments, bond energies of at least 0.8, or even at least 0.95 electron volts, may be useful.

In some embodiments, the binding group X comprises a phosphonic acid. In some embodiments, the binding group comprises a sulfonic acid.

In some embodiments, the surface-modifying agent also comprises a reactive group, i.e., a group capable of reacting with the curable resin, e.g., during the curing process. This can result in the nanocalcite particle being strongly bonded into the resin matrix and may lead to an improvement in the physical properties of the resulting cured nanocomposite. Generally, the reactive group is selected based on the nature of the curable resin. In some embodiments, the reactive group may be located on the end of the Y group, i.e. Y2. In some embodiments, the reactive group may be located along the backbone of or pendant to the backbone of the compatibilizing segment. In some embodiments, the reactive group may be located between the compatibilizing segment and the binding group.

In some embodiments, a linking group is present connecting the compatiblizing segment with the binding group. For example, in some embodiments, the surface-modifying agent comprises a polyether amine. Exemplary polyetheramines include those available under the trade name JEFFAMINE™ available from Huntsman Corporation, The Woodlands, Tex. The polyether serves as a compatiblizing segment, while the amine is the linking group linking the compatiblizing segment with the binding group.

In some embodiments, the surface-modifying agent comprises a zwitterion, i.e., a compound carrying a net charge of zero, but which is capable of carrying a formal positive and negative charge on different atoms. In some embodiments, the formal negative charge is carried by the binding group.

In some embodiments, the formal positive charge is carried on the nitrogen atom of an amine, e.g., an amine linking group. In such embodiments, the amine may serve as both the linking group and the reactive group.

The surface modification of the particles in the colloidal dispersion can be accomplished in a variety known ways, such as described in U.S. Pat. Nos. 7,241,437 and 6,376,590. Methods of surface-modifying silica using silane functional (meth)acrylates are described, e.g., in U.S. Pat. Nos. 4,491,508 and 4,455,205 (Olsen et al.); U.S. Pat. Nos. 4,478,876 and 4,486,504 (Chung) and U.S. Pat. No. 5,258,225 (Katsamberis), and incorporated herein.

The inorganic nanoparticles preferably have a substantially monodisperse size distribution or a polymodal distribution obtained by blending two or more substantially monodisperse distributions. Alternatively, the inorganic particles can be introduced having a range of particle sizes obtained by grinding the particles to a desired size range. The inorganic oxide particles are typically non-aggregated (substantially discrete), as aggregation can result in optical scattering (haze) or precipitation of the inorganic oxide particles or gelation. Smaller nanoparticles tend to increase the viscosity of the uncured resin, rendering it more difficult to process.

The inorganic nanoparticles are typically colloidal in size, having an average particle diameter of 5 nanometers to 250 nanometers. More particularly, silica nanoparticles are colloidal having an average particle size of 5-250 nm, preferably 50-150 nm, and calcite nanoparticles have an average particle size of 50-250 nm, preferably 100-150 nm. The average particle size of the nanoparticles can be measured using laser diffraction, dynamic light scattering, and transmission electron microscopy.

In embodiments further comprising reinforcing fibers, particle size of the inorganic nanoparticles are less than about 250 nm, preferably less than 100 nanometers, more preferably less than 50 nm, in order to provide a uniform dispersion of thermoset resin, surface modified nanoparticles and susceptors in the interstitial spaces of the fibers. Conventional fillers (fillers having a particle size greater than one micron) can also be used to increase the modulus of cured thermosetting resin networks, but such fillers are unsuitable for use in the fabrication of advanced composites for the following reasons. During the curing of a fiber-containing composite composition, resin flow sufficient to rid the composition of trapped air (and thereby enable the production of a composite which is free of voids) is required. As the resin flows, finer denier fibers can act as filter media and separate the conventional filler particles from the resin, resulting in a heterogeneous distribution of filler and cured resin. Conventional fillers also frequently scratch the surface of the fibers, thereby reducing fiber strength. This can severely reduce the strength of the resulting composite.

The surface modified nanoparticles are generally used in amounts of 1 to 150 parts by weight, preferably 1 to 50 parts by weight, relative to 100 parts by weight of the thermoset resin.

The inductively curable composition optionally contains reinforcing fibers. The purpose of the fiber reinforcement is to provide strength to the cured composite. Fiber reinforced composites are rapidly emerging as a primary material for use in high performance applications such as manufacture-of aircraft components. Fiber reinforced composites provide structural efficiency at lower densities compared to metallic structures, allowing for the manufacture of light weight, high strength components. Fiber reinforced composites may be prepared using a variety of techniques, for example, hand or automated layup of prepreg, filament winding, compression molding and resin transfer molding. Of these techniques, hand or automated layup of prepreg is most common.

A prepreg comprises a fiber reinforcement impregnated with an uncured or partially cured resin matrix. Prepregs are available in a variety of forms depending on the configuration of the fiber reinforcement. For example, when the fiber reinforcement comprises a fiber bundle (or tow), the prepreg is specifically referred to as a "towpreg". By way of another example, when the fiber reinforcement comprises a collimated series of fiber bundles, the prepreg is specifically referred to as "prepreg tape". The fibers of the fiber reinforcement can comprise a variety of different materials including glass fibers, carbon fibers, polyamide fibers such as poly(p-phenylene terephthalamide) fibers (for example, Kevlar™ fiber available from E.I. duPont de Nemours and Co., Inc., Wilmington, Del.) and ceramic fibers. Carbon fibers are typically used as the reinforcing fiber in advanced aerospace structural composites.

The fiber reinforcement may comprise a variety of configurations. For example, the fiber reinforcement may comprise a woven structure constructed by interlacing yarns, fibers or filaments to form patterns such as plain, harness satin or leno weaves. Alternatively, the fiber reinforcement may comprise a nonwoven structure or planar textile structure produced by loosely compressing together fibers, yarns, and the like. The fiber reinforcement may also comprise a tow (i.e., an untwisted bundle of continuous fibers) or a roving (i.e., a number of yarns, strands, tows or ends collected into a parallel bundle with little or no twist).

The fibers of the reinforcement may be unsized or coated with sizing.

Suitable fibers include both organic and inorganic fibers, e.g., carbon or graphite fibers, glass fibers, ceramic fibers, boron fibers, silicon carbide fibers, polyimide fibers, polyamide fibers, polyethylene fibers, alumina fibers, and the like, and combinations thereof. Fibers of carbon, glass, or polyamide are preferred due to considerations of cost, physical properties, and processability. Such fibers can be in the form of a unidirectional array of individual continuous fibers, woven fabric, knitted fabric, yarn, roving, braided constructions, or non-woven mat.

Generally, the compositions can contain, e.g., from about 10 to about 80, preferably from about 30 to about 70 volume percent fibers, depending upon structural application requirements. Methods In general, the induction curable composition may be prepared by blending the thermoset resin, the susceptors particles and the surface modified inorganic particles. In some preferred embodiments, the commercial susceptors are milled in the thermoset resin, and optional solvent, to reduce the agglomerates and provide a more uniform particle size distribution.

The susceptors and the surface-modified inorganic particles are combined with a curable thermoset resin and any solvent removed by, e.g., using a rotary evaporator. (The removal of the solvent can, alternatively, be delayed until after combination with reinforcing fibers, if desired.) Preferably, the solvent is removed by heating under vacuum to a temperature sufficient to remove even tightly-bound volatile components. Stripping times and temperatures can generally be selected so as to maximize removal of volatiles while minimizing advancement of the resin. Failure to adequately remove volatiles at this stage leads to void formation during the curing of the composition, resulting in deterioration of thermomechanical properties in the cured composites. (This is a particularly severe problem in the fabrication of structural composites, where the presence of voids can have a disastrous effect on physical properties.) Unremoved volatiles can also plasticize the cured resin network and thereby degrade its high temperature properties. Generally, resins having volatile levels less than about 2 weight percent (preferably, less than about 1.5 weight percent) provide void-free composites having the desired thermomechanical properties.

Removal of volatiles can result in gel formation (due to loss of any surface-bound volatiles), if the above-described surface-modified particles are not properly chosen so as to be compatible with the curable resin, if the agent is not tightly-bound to the particle surface, and/or if an incorrect amount of agent is used. As to compatibility, the treated particle and the resin should generally have a positive enthalpy of mixing to ensure the formation of a stable sol. (Solubility parameter can often be conveniently used to accomplish this by matching the solubility parameter of the surface treatment agent with that of the curable resin.).

Removal of the volatiles provides curable resin composition which can generally contain from about 1 to 150 parts by weight of surface-modified nanoparticles, 0.1 to 50 parts by weight of susceptors particles, relative to 100 parts by weight of thermoset resin. The composition may optionally include reinforcing fibers, as described.

In some preferred embodiments two separate thermoset compositions are prepared, combined and cured by induction. The first thermoset composition comprises the inorganic nanoparticles and thermoset resin. The second thermoset composition comprises the susceptors and resin. The optional reinforcing fibers may be combined with the first or second compositions, or may be added to the combined composition. When using continuous fibers (instead of chopped fibers) it is preferred to combine the first and second thermoset compositions prior to combining with the fibers.

In one embodiment, the first thermoset composition may be prepared by providing a hydrosol (e.g., a silica hydrosol) with a water-miscible organic liquid (e.g. a solvent such an alcohol, ether, amide, ketone, or nitrile) and, optionally (if alcohol is used as the organic liquid), a surface treatment agent such as an organosilane or organotitanate. Alcohol and/or the surface treatment agent can generally be used in an amount such that at least a portion of the surface of the particles is modified sufficiently to enable the formation of a stable curable resin sol (upon combination with curable resin, infra).

Preferably, the amount of alcohol and/or treatment agent is selected so as to provide particles which are at least about 50 weight percent metal oxide (e.g., silica), more preferably, at least about 75 weight percent metal oxide. (Alcohol can be added in an amount sufficient for the alcohol to serve as both diluent and treatment agent.) The resulting mixture can then be heated to remove water by distillation or by azeotropic distillation and can then be maintained at an elevated temperature to enable the reaction (or other interaction) of the alcohol and/or other surface treatment agent with chemical groups on the surface of the nanoparticles. This provides an organosol comprising nanoparticles which have surface-modified organic groups as described.

The resulting organosol can then be combined with a thermoset resin and the organic liquid removed by, e.g., using a rotary evaporator. (The removal of the organic liquid can, alternatively, be delayed until after combination with reinforcing fibers, if desired.) Preferably, the organic liquid is removed by heating under vacuum to a temperature sufficient to remove even tightly-bound volatile components. Stripping times and temperatures can generally be selected so as to maximize removal of volatiles while minimizing advancement of the resin. Failure to adequately remove volatiles at this stage leads to void formation during the curing of the composition, resulting in deterioration of thermomechanical properties in the cured composites. (This is a particularly severe problem in the fabrication of structural composites, where the presence of voids can have a disastrous effect on physical properties.) Unremoved volatiles can also plasticize the cured resin network and thereby degrade its high temperature properties.

Generally, resin sols having volatile levels less than about 2 weight percent (preferably, less than about 1.5 weight percent) provide void-free composites having the desired thermomechanical properties. Further details of this process are described in U.S. Pat. No. 5,648,407 (Goetz et al.), incorporated by reference. This composition may be combined with the second thermoset composition containing the susceptors, and inductively cured.

In a second embodiment, the first thermoset composition may be prepared by providing a feedstock comprising (i) untreated nanoparticles, (ii) a surface treatment agent reactive with the nanoparticles, and (iii) solvent; directing the feedstock through a continuous reactor maintained at a temperature sufficient to react the nanoparticles with the surface treatment agent to provide functionalized nanoparticles; and combining and homogeneously mixing the product of the reactor comprising functionalized nanoparticles and solvent with an thermoset polymer matrix in a vacuum kneader comprising an apparatus capable of mixing polymers and fillers under vacuum selected from apparatus comprising: a twin screw mixing apparatus; two intermeshing kneading blades; or a shaft in a cylindrical housing the shaft having disk elements thereon, said disk elements having attached peripheral bars, and the cylindrical housing having bars mounted on the inside designed to clean the shaft and disk elements as the shaft rotates, under conditions of temperature and vacuum sufficient to evaporate solvent and to provide the filled resin, the functionalized nanoparticles comprising at least about 40% by weight of the filled resin and comprising nanoparticles. Details of this second embodiment may be found in U.S. Pat. No. 8,487,019 (Nelson et al.), incorporated herein by reference.

In a third embodiment, the inorganic nanoparticles are selected from surface modified calcite nanoparticles. A first thermoset resin may be prepared by milling calcite particles in the presence of a surface modifying agent and a thermoset resin. In a preferred embodiment nanocalcite aggregates were pre-dispersed in a thermoset resin and optional solvent, with a high shear mixer. This dispersion was then further milled by repeated cycling through a zeta configuration bead mill having a zirconia chamber and zeta mixer, such as a NETZCH "MiniCer" zeta configuration bead mill. The chamber may be filled with 200 micron zirconia milling media. The chamber and cooled during milling. The dispersion may cycled through the mill and periodically evaluated until the desired state of dispersion was reached. Reinforcing fibers may be impregnated with the milled mixture, combined with the second thermoset composition (containing the susceptors) and inductively cured. Details of the preparation of this first thermoset mixture may be found in US 2011/024376 (Schultz et al.) and is incorporated by reference.

In a fourth embodiment the inorganic nanoparticles are selected from surface modified calcite nanoparticles. The first thermoset composition may be prepared by a solventless process combining nanoparticles, a surface modifying agent, a curable resin and a reactive diluent to form a mixture, and milling the mixture in a wet milling apparatus comprising milling beads to form a milled resin system. This may used to impregnate reinforcing fibers, and combined with the second thermoset composition containing the susceptors, and inductively cured. Details of the preparation of this first thermoset mixture may be found in US 2012/0214948 (Condo et al.) and is incorporated by reference.

The second thermoset composition may be prepared similarly by combining the susceptor particles, surface-modifying agent and thermoset resin, and milling until the desired surface-modified susceptor nanoparticles result.

The compositions are heated and cured by passing between induction coils powered by AC or radio frequency (RF) energy or by passing a mobile or handheld coil unit, such as an RF powered coil unit, around a substrate. The rate of induction heating or cure depends on the magnetic field strength created by AC or by RF, and is proportional to and highly dependent upon the frequency of the magnetic field created by AC or RF and to the amount and type of magnetic material in the curable composition. Less induction heating is required if the amount of susceptor material in the composition is increased if the susceptor material is evenly dispersed into the composition, if the susceptor material in the composition has a relatively high Curie temperature, if conductive particles are included in the composition along with magnetic submicron particles, if the substrate is metallic or conductive, or if the frequency of the magnetic field is increased.

Useful induction frequencies may be 50 kHz or more, for example, 100 KHz or more, or 400 KHz or more, and up to 40 MHz, for example up to 10 MHz, or up to 2.5 MHz. Preferred ranges include 250 kHz to 1 MHz. In general, a composition is subject to induction heating and cures in a period of from 20 seconds to 20 minutes. Preferred magnetic field strengths are from 100 to 1000 Gauss.

Induction curing units may come in a variety of shapes and sizes, such as C-shaped or U-shaped devices arranged so that conveyors run through them; bar, cable or wire heating units which have long cylindrical openings within them of various diameters; solenoids and loops of coil surrounding a flat plate, i.e. a hand-mirror design, for heating surfaces of one or more objects; and, further, coil cabinets, furnaces and planar arrays of coils for generalized heating in the proximity of the coils. For example, a U-shaped unit having a copper winding around a ferromagnetic core fed by AC from an inverter may be used to heat coatings in an alternating electric field (180 V, 250 kHz). Suitable speeds for conveyor lines running through coil units may range 0.1 meters per minute or more, or 2.0 meters per minute or more, up to 10.0 meters per minute or less, or 8.0 meters per minute or less.

EXAMPLES

Test Methods

Dynamic Mechanical Analysis (DMA)

The storage modulus and Tan Delta (glass transition temperature–Tg) of the cured samples were measured from 20° C. to 170° C. using a TA instruments Q800 Dynamic Mechanical analyzer at 1 Hz with a constant amplitude of 20 microns with a single cantilever configuration. The DMA test samples were prepared by pouring the uncured sample composition into a silicone mold (12 mm×3 mm×30 mm). The test sample was removed from the mold and clamped into the test fixture. The pre-determined amplitude and frequency were applied to the test sample and the stress response of the material was measured. E', elastic modulus and E", loss modulus were measured. The ratio of E"/E', also referred to Tan delta, E', and E" vs. temperature were obtained. $T_g$ was obtained at the maximum of Tan delta. The Tg and plateau modulus are reported in Table 2 below. The plateau modulus was measured in the relatively flat portion of the modulus-temperature plot before the Tg (approximately 40° C.).

TABLE 1

Materials used

| Designation | Description | Supplier |
| --- | --- | --- |
| Iron (II, III) Oxide ($Fe_3O_4$) Nano Powder | 99.9% $Fe_3O_4$, 20-50 nm (TEM & BET) in average size, spinel crystal structure, black magnetic powder | Inframat Advanced Materials, Manchester CT |
| Epon 826 | A diglycidyl ether of bisphenol A having an epoxy equivalent weight of 182 | Momentive Specialty Chemical Inc., Houston, TX |
| BYK-W 9010 | Dispersive additive of a 100 percent solids phosphoric acid ester having an acid value of 129 mg potassium hydroxide/gram, | BYK USA, Wallingford CT |
| Torayceram Zirconia Beads 0.5 mm | Zirconia milling media (0.5 mm average diameter) | Toray Industries, Inc., Tokyo, Japan, |
| Lindride 36V | Isomeric form of methyltetrahydrophthalic anhydride | Lindau Chemicals Inc., Columbia, SC |
| 3M Matrix Resin 4831 | A nanoparticle filled bis-A resin system | 3M Company, St Paul, MN |
| MEK | Methyl Ethyl Ketone | Sigma Aldrich |

Comparative Example C1

A curable composition was prepared by milling iron oxide particles into an Epon 826 epoxy matrix with a dispersant using a MiniCer Laboratory Mill (obtained from Netzsch, Exton, Pa.). The milling media was 0.5 mm yttria stabilized zirconia beads and 500 g was charged into mill before experiment. A batch of 60.0 grams of Iron Oxide nanoparticles (20-50 nm average size from TEM & BET), 540 grams of epoxy resin, and 53.3 grams of BYK-W 9010 dispersant were charged into the MiniCer mill through a peristaltic pump at a 250 ml/min flow rate. The mill shaft was run at 4320 rpm and the motor was run at 72 Hz and approximately 2.4 amps. The milling process was run until the desired particle sizes were obtained which was approximately 3 hours for a 600 g batch. The weight percent of the iron oxide in the batch was 9.2%. The batch was then discharged from the mill and a 10.0 gram sample of the batch was mixed with 80 g of Lindride 36V curative in a speed mixer cup. The sample was then cured in a Despatch oven for 2 hours at 90° C. followed by 2 hours at 150° C. Dispersion particle sizes were measured using a Partica LA-950 Laser Diffraction Particle Size Distribution Analyzer obtained from Horiba (Irvine, Calif.).

Example 1 (Iron Oxide in Epon 826—Induction Heated)

A curable composition was prepared as in C1 above except the curing was done with an Ameritherm EasyHeat LI8310 induction heating system at a frequency of 207 kHz with a 4 turn coil (52.5 mm inner diameter). Approximately 2.0-2.5 grams of the batch with curative was placed in a silicone cup which in turn was placed in the center of the induction heater coils. A fiber optic thermometer was placed into the cup to measure the internal temperature of the composition. Three different samples were cured at amperages of 200 A, 300 A and 400 A for 600 seconds or until the internal temperature of the composition reached 250° C. whichever came first. The curing temperature profile of the samples is shown in FIG. 1.

Comparative Example C2 (5 wt % Iron (II,III) Oxide in Epon 826—Oven Cure)

2.21 grams of a pre-made mixture of iron oxide (22.6 wt %) with Epon 826 (72.4 wt %), 4.66 g of Epon 826 and 3.13 g of Lindride 36V were mixed in a Thinky ARV-310/ARV-310LED speed mixer for 1 minute at 2000 rpm. The curable mixture was then poured into the DMA silicone mold described above to form a test specimen. The specimen was then thermally cured in an oven for 2 hours at 90° C. followed by 2 hours at 150° C. The sample was them tested according to the DMA test procedure above. The storage modulus of the specimen at 40° C. was 2626 MPa with a glass transition temperature ($T_g$, peak of Tan delta) of 98.3° C.

Example 2 (5 wt % Iron (II,III) Oxide in Epon 826—Induction Heated)

A DMA test specimen was made as described in Comparative Example C2 except that the curable mixture was cured in an Ameritherm EasyHeat LI8310 induction heating system at frequency of 245 kHz using a 9 turn coil with an inner diameter of 72 mm. The coil was operated at the following conditions—250 A—245 kHz—1493 W (10 mins); 350 A—245 kHz—3159 W (10 mins); 380 A—245 kHz—3558 W (5 mins). The specimen was tested according to the DMA test procedure. The storage modulus at 40° C. was 3053 MPa with a glass transition temperature ($T_g$, peak of Tan delta) of 85.59° C.

Comparative Example C3 (10 wt % Iron (II,III) Oxide in Epon 826—Oven Cured)

A DMA test specimen was prepared using the method described in Comparative Example C2 except that the curable mixture consisted of 4.4 grams of a pre-mix (22.6 wt % Iron oxide in Epon 826), 2.78 g of Epon 826 and 2.8 g of Lindride 36V. The specimen was tested according to the DMA test procedure. The storage modulus at 40° C. was 1616 MPa with a glass transition temperature ($T_g$, peak of Tan delta) of 103.4° C.

Example 3 (10 wt % Iron (II,III) Oxide in Epon 826—Induction Heat)

A DMA test specimen was prepared using the method described in Example 2 except that the curable mixture consisted of 4.4 grams of a pre-mix (22.6 wt % Iron oxide in Epon 826), 2.78 g of Epon 826 and 2.8 g of Lindride 36V. The sample was tested according to the DMA procedure. The storage modulus at 40° C. was 2626 MPa with a $T_g$ of 85° C.

Comparative Example C4 (5 wt % Iron (II,III) Oxide in 20 wt % 3M 4831—Oven Cure)

A DMA test specimen was prepared using the method described in Comparative Example C2 except that the curable mixture consisted of 6.62 grams of a pre-mix (22.6 wt % Iron oxide in Epon 826), 0.91 g of Epon 826, 3.25 g of 3M Matrix Resin 4831 and 4.23 g of Lindride 36V. The sample was tested according to the DMA procedure. The storage modulus at 40° C. was 2429 MPa with a $T_g$ of 110° C.

Example 4 (5 wt % Iron (II,III) Oxide in 20 wt % 3M 4831—Induction Heating)

A DMA test specimen was prepared using the method described in Example 2 except that the curable mixture was the same as in Example 4. The sample was tested according to the DMA procedure. The storage modulus at 40 C was 2697 MPa with a $T_g$ of 107° C.

Comparative Example C5 (5 wt % Iron (II,III) Oxide with Carbon Fiber—Oven Cure)

6.62 grams of a pre-mix (22.6 wt % Iron oxide in Epon 826), 0.91 g of Epon 826, and 2.47 g of Lindride 36V were speed mixed under vacuum for 1.5 minutes. A UD Saertex® fabric (Toray T700) were cut into 12 mm×30 mm pieces and used for the epoxy/fabric layup, which were layed up layer by layer in a mold. The mold was vacuum bagged to remove any voids and to consolidate the entire part. The sample was placed in an oven and cured at 90° C. for 2 hours followed by 150° C. for 2 hours to cure the composite. The sample was tested according to the DMA procedure described above. The $T_g$ of the composite was 93° C.

Example 5 (5 wt % Iron (II,III) Oxide with Carbon Fiber—Induction Heating)

A DMA test specimen was prepared using the method described in Comparative Example C5 except that except that the curable mixture was cured in an Ameritherm EasyHeat LI8310 induction heating system at frequency of 245 kHz using a 9 turn coil with an inner diameter of 72 mm. The coil was operated at the following conditions—250 A—245 kHz—1493 W (10 mins); 350 A—245 kHz—3159 W (10 mins); 380 A—245 kHz—3558 W (5 mins). The sample was tested according to the DMA procedure described above. The $T_g$ of the composite was 87.7° C.

Comparative Example C6 (5 wt % Iron (II,III) Oxide with Glass Fiber—Oven Cure)

A DMA test specimen was prepared using the method described in Comparative Example C5 except that a woven glass fabric was used. The $T_g$ of the composite was 91° C.

Example 6 (5 wt % Iron (II,III) Oxide with Glass Fiber—Induction Heating)

A DMA test specimen was prepared using the method described in Example 5 except that woven glass fabric was used. The $T_g$ of the composite was 83° C.

TABLE 2

| Sample | | Tg (° C.) | Plastic Elastic Modulus (MPa) |
|---|---|---|---|
| C2 | 5 wt % Oven | 98.3 | 2626 |
| 2 | 5 wt % IH | 85.6 | 3053 |
| C3 | 10 wt % Oven | 103.4 | 1616 |
| 3 | 10 wt % IH | 85 | 2626 |
| C4 | 5 wt % Iron oxide + 20 wt % Silica- Oven | 110 | 2429 |
| 4 | 5 wt % Iron oxide + 20 wt % Silica- IH | 107 | 2697 |
| C5 | 5 wt % Iron oxide + Carbon fiber-Oven | 93 | — |
| 5 | 5 wt % Iron oxide + Carbon fiber-IH | 87.7 | — |
| C6 | 5 wt % Iron oxide + Glass fiber-Oven | 91 | — |
| 6 | 5 wt % Iron oxide + Glass fiber-IH | 83 | — |

The invention claimed is:

1. An inductively curable composition comprising:
 a) a thermoset resin;
 b) ferromagnetic susceptor particles having an average particle size of less than 500 nanometers;
 c) surface-modified inorganic nanoparticles;
 wherein the ferromagnetic susceptor particles b) are present in amounts of 0.1 to 50 parts by weight; and
 wherein the surface-modified inorganic nanoparticles are present in amounts of 1 to 150 parts by weight, relative to 100 parts by weight of the thermoset resin, and wherein the ferromagnetic susceptor particles are surface-modified by an agent of the formula A-Z-B dispersants wherein A is derived from a non-ionic surface active agent, B is an organic acid group which anchors the dispersing agent to the ferromagnetic susceptor particles, and Z is a connecting group linking A to B wherein Z comprises at least one carbon atom.

2. The inductively curable composition of claim 1 comprising 1 to 25 parts by weight of the ferromagnetic susceptor particles.

3. The inductively curable composition of claim 1 wherein the ferromagnetic susceptor particles are less than 250 nm average diameter.

4. The inductively curable composition of claim 1 wherein the ferromagnetic susceptor particles are 100 to 250 nm average diameter.

5. The inductively curable composition of claim 1 wherein the ferromagnetic susceptor particles are $Fe_3O_4$ particles.

6. The inductively curable composition of claim 1 wherein the thermoset resin is selected from the group consisting of epoxy resins, vinyl ester resins, maleimide resins, and polycyanate ester resins.

7. The inductively curable composition of claim 1 further comprising reinforcing fibers.

8. The inductively curable composition of claim 7 comprising 10 to about 80 volume percent of reinforcing fibers.

9. The inductively curable composition of claim 1 wherein the surface modified inorganic nanoparticles are surface modified silica nanoparticles.

10. The inductively curable composition of claim 9 wherein the surface modified silica nanoparticles are modified by silane with alkyl, phenyl, amine or epoxy groups.

11. The inductively curable composition of claim 1 wherein the surface modified inorganic nanoparticles are surface modified calcium carbonate nanoparticles.

12. The inductively curable composition of claim 11 wherein the calcium carbonate nanoparticles are modified by a surface modifier with sulfate, phosphate, or carboxylate groups.

13. The inductively curable composition of claim 1 wherein the surface modified nanoparticles are used in amounts of 1 to 50 parts by weight, relative to 100 parts by weight of thermoset resin.

* * * * *